(12) United States Patent
Liu et al.

(10) Patent No.: US 10,751,807 B2
(45) Date of Patent: Aug. 25, 2020

(54) MATERIAL TRANSFERRING AND POSITIONING DEVICE FOR WHEEL MACHINING CENTER

(71) Applicant: CITIC Dicastal CO., LTD, Qinhuangdao (CN)

(72) Inventors: Weidong Liu, Qinhuangdao (CN); Na Zhang, Qinhuangdao (CN); Liguang Xie, Qinhuangdao (CN); Jing Wang, Qinhuangdao (CN); Shujuan Li, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 0 days.

(21) Appl. No.: 16/407,666

(22) Filed: May 9, 2019

(65) Prior Publication Data

US 2020/0038965 A1   Feb. 6, 2020

(30) Foreign Application Priority Data

Jul. 31, 2018   (CN) .......................... 2018 1 0855600

(51) Int. Cl.
*B23B 31/171*   (2006.01)
*B23Q 3/08*   (2006.01)

(52) U.S. Cl.
CPC ........ *B23B 31/16145* (2013.01); *B23Q 3/082* (2013.01); *B23B 2215/08* (2013.01); *Y10T 279/1033* (2015.01); *Y10T 279/1074* (2015.01)

(58) Field of Classification Search
CPC .......... B23B 31/1612; B23B 31/16141; B23B 31/16145; B23B 2215/08; B23Q 3/08; B23Q 3/082; Y10T 279/1033; Y10T 279/1074
See application file for complete search history.

(56) References Cited

U.S. PATENT DOCUMENTS

| | | | | | |
|---|---|---|---|---|---|
| 1,356,574 | A | * | 10/1920 | Warder | B29D 30/0061 279/2.19 |
| 3,038,280 | A | * | 6/1962 | Dralle | B23F 23/08 451/460 |
| 5,503,508 | A | * | 4/1996 | Amiguet | B23B 31/4006 408/1 R |
| 9,248,515 | B2 | * | 2/2016 | Chou | B23B 31/185 |
| 10,155,267 | B1 | * | 12/2018 | Yang | B23B 31/18 |
| 10,232,454 | B2 | * | 3/2019 | Liu | B22D 11/126 |
| 10,500,649 | B2 | * | 12/2019 | Xue | B23B 31/16 |
| 2020/0038895 | A1 | * | 2/2020 | Liu | B05B 12/30 |

* cited by examiner

*Primary Examiner* — Eric A. Gates
(74) *Attorney, Agent, or Firm* — Calfee, Halter & Griswold LLP

(57) ABSTRACT

The present application provides a material transferring and positioning device for a wheel machining center, which includes a base plate, a base, a first bearing, a first shaft sleeve, a hydraulic cylinder brake, a rotary cylinder, a cap and so on. The application may meet the positioning requirement of the wheel machining center, and has the advantages of simple structure, convenient manufacture, stable performance, high positioning precision and simple operation, so that it is very suitable for automatic mass production.

5 Claims, 6 Drawing Sheets ental thrust to the contact side facing to the window of the wheel. At the same time, under the combined action of friction force generated by the high precision first bearing and the flange surface of the wheel with the upper end of the first shaft sleeve, the high-precision centering mechanism and the wheel rotate around the center of the first bearing, the other side of the conical support is gradually in contact with the side corresponding to the window of the wheel, and
MATERIAL TRANSFERRING AND POSITIONING DEVICE FOR WHEEL MACHINING CENTER

CROSS-REFERENCE TO RELATED APPLICATIONS

This application claims priority to Chinese Patent Application No. 201810855600.4 filed on Jul. 31, 2018, which is hereby incorporated by reference in its entirety.

TECHNICAL FIELD

The application relates to a positioning device, and more particularly to a high-precision positioning device in a machining process of a wheel to meet the processing position requirements of a bolt and an auxiliary hole such as a valve hole.

BACKGROUND ART

In the automobile wheel production industry, the labor cost is higher and higher, the automation degree of the production process is higher and higher, and the process of processing the wheels by a robot is more and more mature. In the process of automatically machining the wheel by the robot, due to the fact that the machining center is time-consuming in three machining processes, that is a first-sequence machining process, a second-sequence machining process and a machining center, the wheel is required to be temporarily stored after the second-sequence machining process is completed, and the wheel is transferred to the machining center by the robot to be machined after the last wheel is machined in the machining center. During the first sequence and the second sequence machining process of the wheel, there will be an offset in the circumferential position of the wheel, which can lead to the inaccurate circumferential positioning of the machining center, and the rejection rate of the wheel will be greatly increased.

SUMMARY OF THE INVENTION

It is an object of the present application to provide a material transferring and positioning device for a wheel machining center.

In order to achieve the above object, the technical solution of the present application is: A material transferring and positioning device for a wheel machining center includes a base plate, a base, a first bearing, a first shaft sleeve, a hydraulic cylinder brake, a rotary cylinder, a cap, a second shaft sleeve, a second bearing, a sleeve, contacts, first linear bearings, springs, a synchronous cam, an end cap, a rotating shaft, a conical support, guide shafts, a bearing seat, second linear bearings, a mount, a connecting plate, a mounting plate and a cylinder.

The material transferring and positioning device for a wheel machining center is provided with a high-precision centering mechanism and a circumferentially automatic adjusting mechanism.

In the high-precision centering mechanism, the hydraulic cylinder brake, the rotary cylinder, the sleeve and the second shaft sleeve are installed on the first shaft sleeve; the second bearing and the rotating shaft are enclosed in the second shaft sleeve by the end cap, and the two ends of the rotating shaft are respectively connected to the output shaft of the rotary cylinder and the synchronous cam; the three or more first linear bearings are uniformly installed in the side wall of the sleeve; three or more uniform curved surfaces are provided in the side wall of the synchronous cam; the outer end of each of the three or more contacts is provided with one of the springs and the first linear bearings, and the inner ends of the three or more contacts are respectively connected to the same number of arcs of the high-precision synchronous cam; the two ends of one of the springs are respectively in contact with one of the first linear bearings and the axial end surface of one of the contacts, and the springs always have elastic force, so that the inner ends of the contacts are always pressed against the synchronous cam;

In the circumferentially automatic adjusting mechanism, the base and the mount are fixed on the base plate; the first shaft sleeve is installed in the base by the first bearing and the cap; the cylinder is installed in the mount by the mounting plate; the output shaft of the cylinder is connected to the connecting plate; the two symmetrical second linear bearings are installed in the mount by the bearing seat; each of the two guide shafts is provided with one of the second linear bearings; the upper ends of the two guide shafts are connected to the conical support, and the lower ends thereof are connected to the connecting plate.

The rotating cylinder drives the synchronous cam to rotate through the second bearing and the rotating shaft; and the arcs uniformly distributed in the side wall of the synchronous cam drive the series of contacts to move radially outward synchronously; and the hydraulic cylinder brake fixes the rotary cylinder at a certain position.

During the resetting of the rotary cylinder, the spring presses the axial end surface of the contact to make the inner end of the contact being always in contact with the synchronous cam, and the series of contacts are synchronously moved radially inward.

The high-precision centering mechanism rotates around the center of the first bearing by the first bearing.

The cylinder drives the conical support to vertically move with high precision by the second linear bearings.

Before actual use, the rotary cylinder does not work, the spring is in the maximum length, the outer diameter of a series of contacts is the smallest diameter, and the cylinder is in the contracted state. In actual use, the wheel is placed in the device, the flange surface of the wheel is placed on the upper end of the first shaft sleeve, the series of contacts are inserted into the center hole of the wheel, and a window of the wheel is above the conical support. The rotating cylinder may drive the synchronous cam to rotate through the second bearing and the rotating shaft, the arcs uniformly distributed in the side wall of the synchronous cam drive the series of contacts to move radially outward synchronously, the series of contacts finally tighten the center hole of the wheel, the hydraulic cylinder brake works, the cylinder is maintained in this state, and the radially positioning of the wheel is completed. The cylinder is fed with high-pressure air; one side of the conical surface of the conical support gradually is in contact with the side corresponding to the specific window of the wheel. Under the combined action of the thrust of the cylinder and the gravity of the wheel, the conical inclined surface of the conical support applies circumferential thrust to the contact side facing to the window of the wheel. At the same time, under the combined action of friction force generated by the high precision first bearing and the flange surface of the wheel with the upper end of the first shaft sleeve, the high-precision centering mechanism and the wheel rotate around the center of the first bearing, the other side of the conical support is gradually in contact with the side corresponding to the window of the wheel, and then the circumferential positioning of the wheel is completed. At this point, the placement and the positioning of the wheel are completed.

The application may meet the positioning requirement of the wheel machining center, and has the advantages of simple structure, convenient manufacture, stable performance, high positioning precision and simple operation, so that it is very suitable for automatic mass production.

Figure 1:
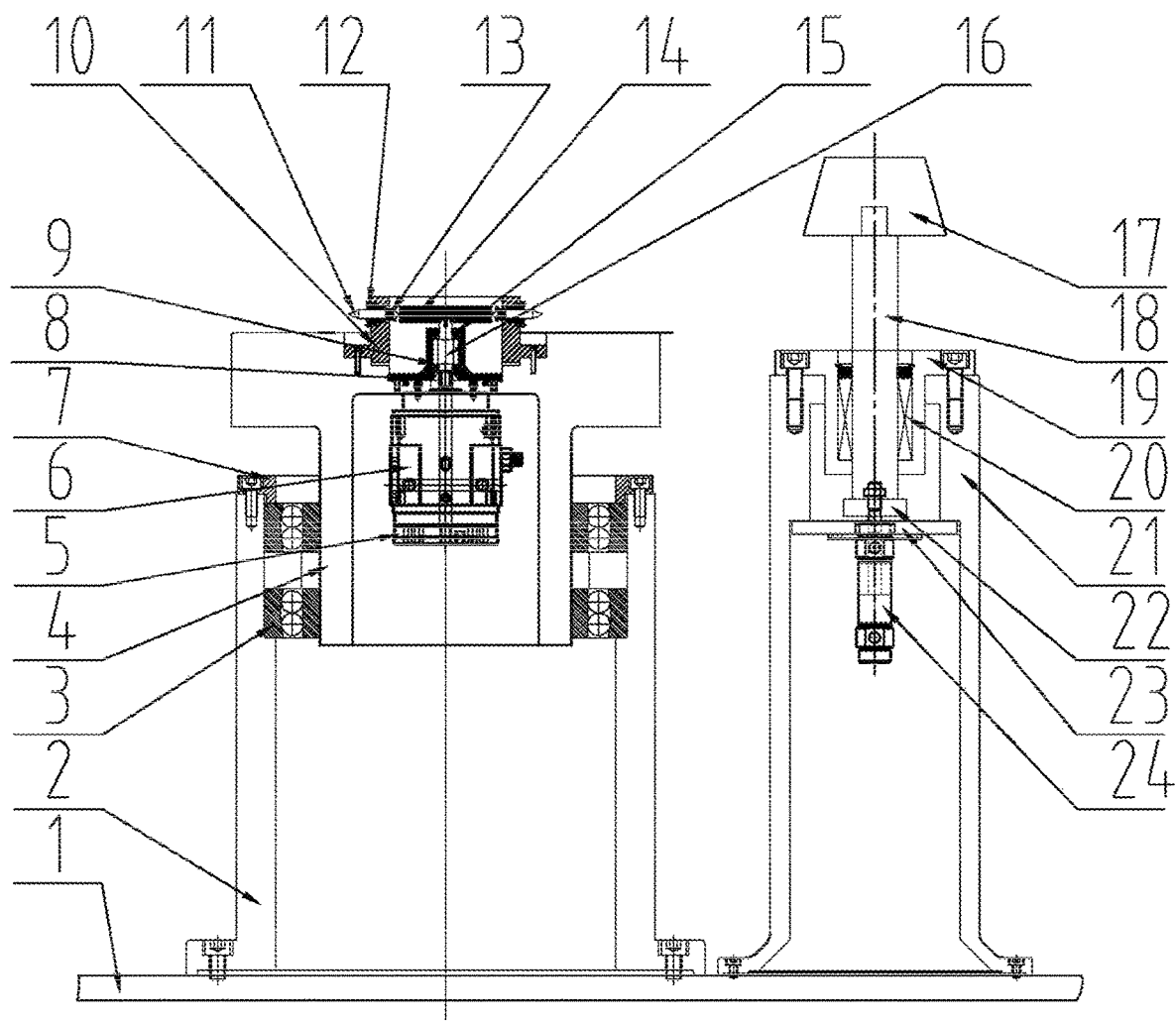
FIG. 1 is a schematic view of a material transferring and positioning device for a wheel machining center of the present application.
Figure 2:
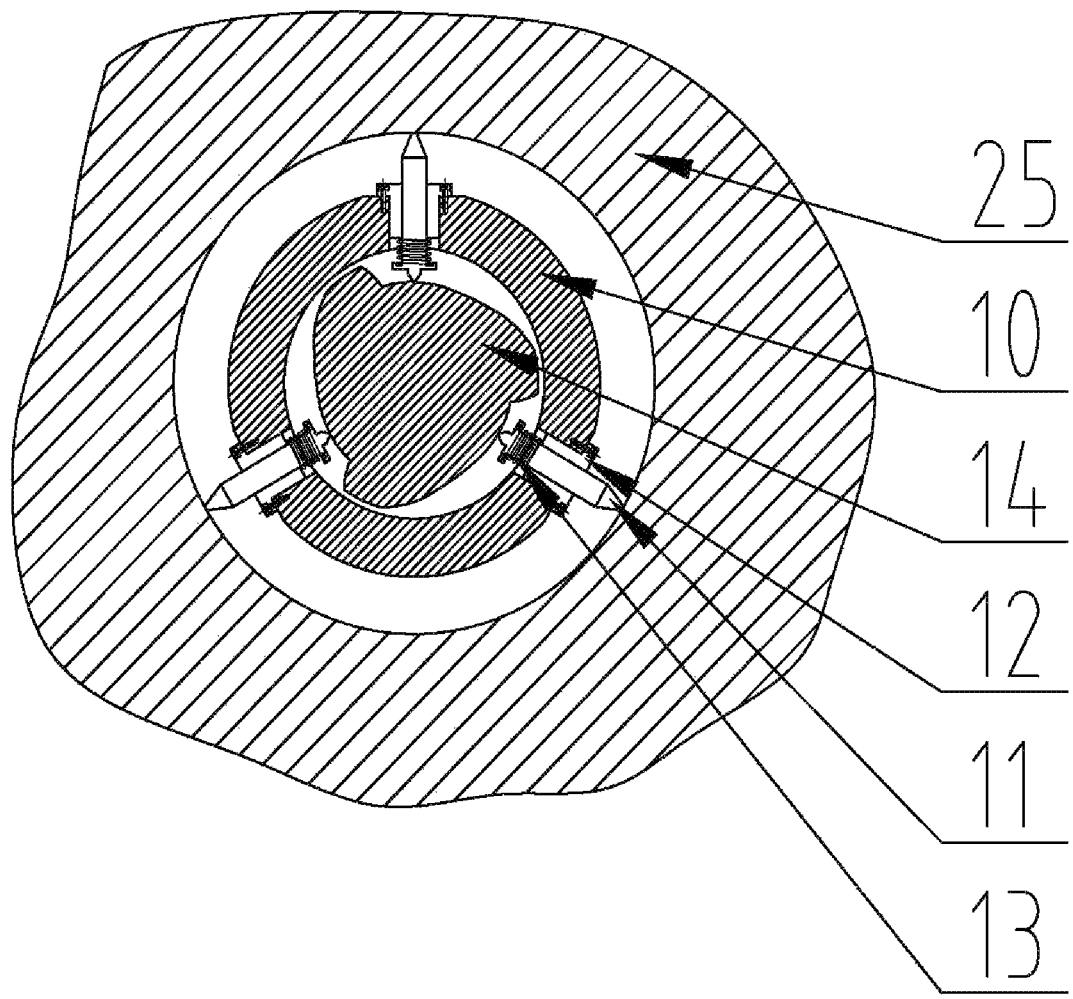
FIG. 2 is a top view of a high-precision centering mechanism in the material transferring and positioning device for a wheel machining center of the present application.
Figure 3:
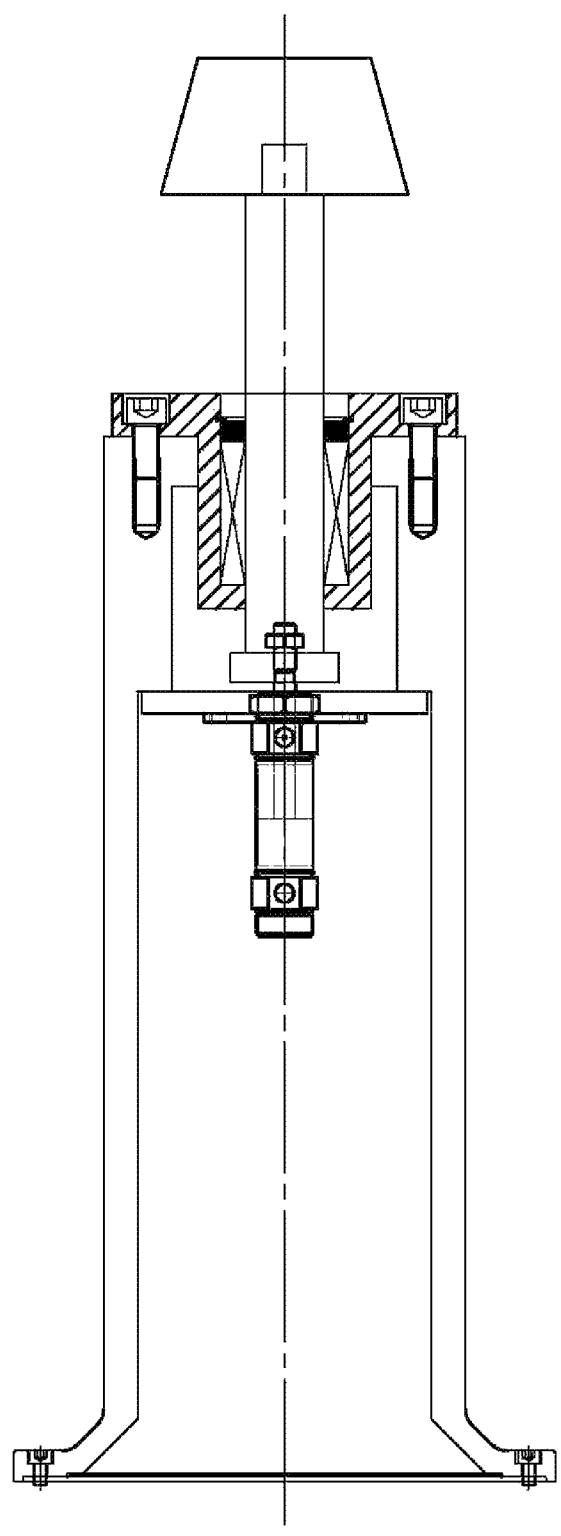
FIG. 3 is a schematic view of a circumferentially automatic adjusting mechanism in the material transferring and positioning device for a wheel machining center of the present application.
Figure 4:
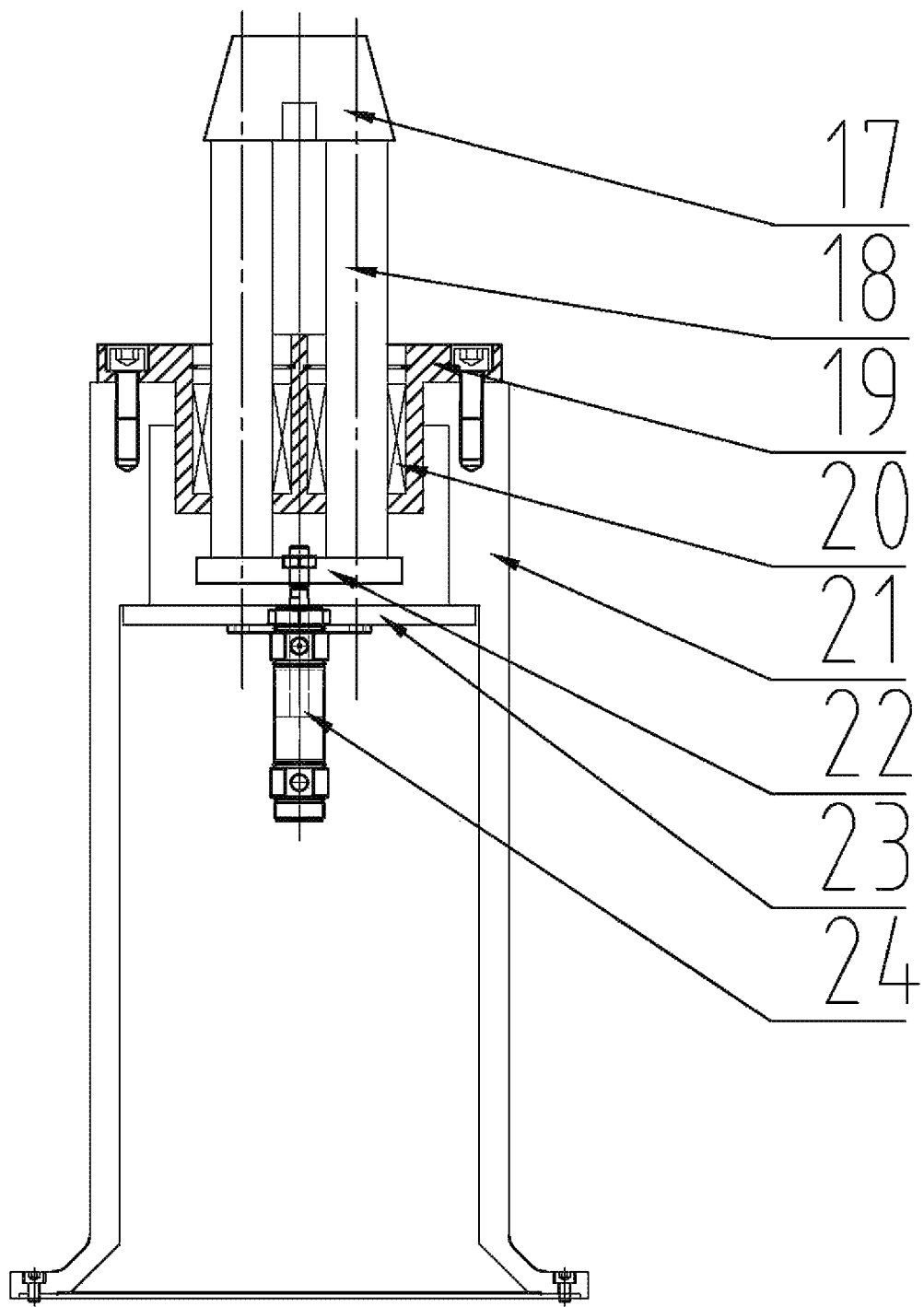
FIG. 4 is a schematic view of a circumferentially automatic adjusting mechanism in the material transferring and positioning device for a wheel machining center of the present application.
Figure 5:
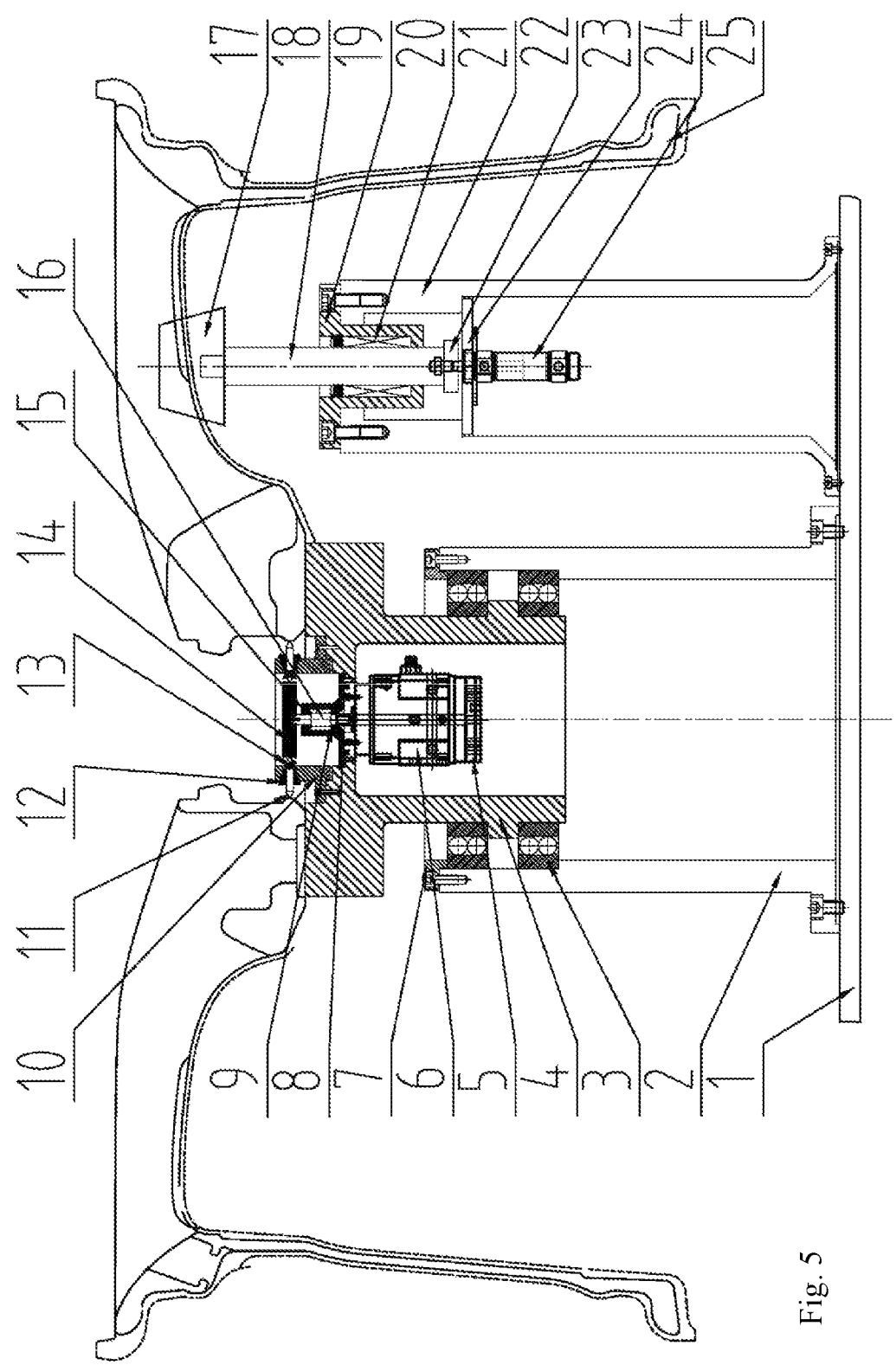
FIG. 5 is a schematic view of the material transferring and positioning device for a wheel machining center of the present application in operation.
Figure 6:
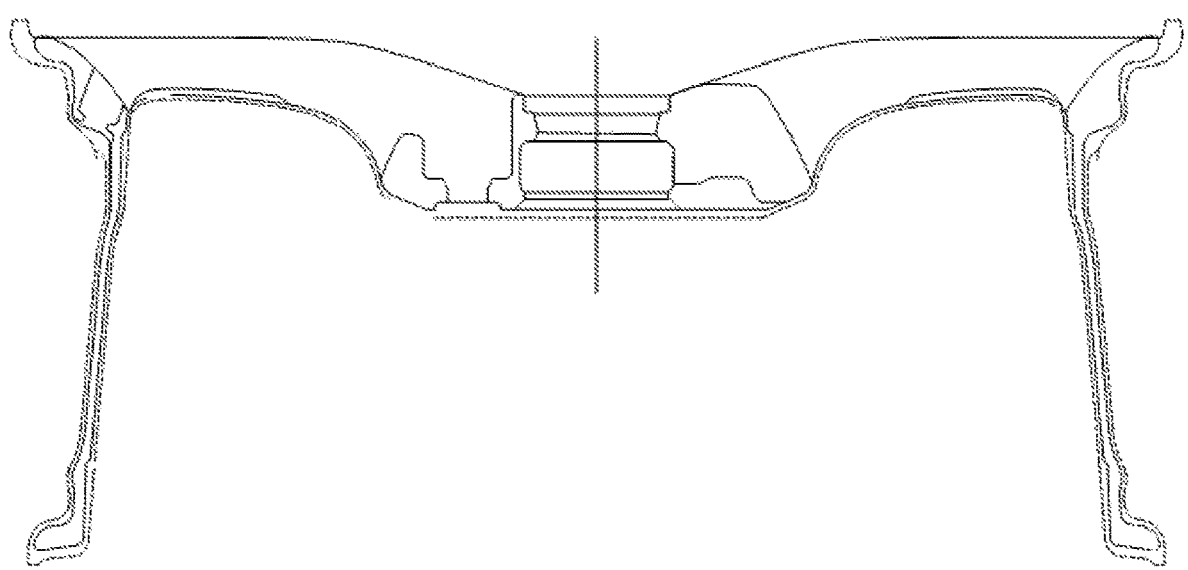
FIG. 6 is a schematic view of a wheel.

In which, 1—base plate, 2—base, 3—first bearing, 4—first shaft sleeve, 5—hydraulic cylinder brake, 6—rotary cylinder, 7—cap, 8—second shaft sleeve, 9—second bearing, 10—sleeve, 11—contact, 12—first linear bearing, 13—spring, 14—synchronous cam, 15—end cap, 16—rotating shaft, 17—conical support, 18—guide shaft, 19—bearing seat, 20—second linear bearing, 21—mount, 22—connecting plate, 23—mounting plate, 24—cylinder, 25—wheel.

DETAILED DESCRIPTION OF THE INVENTION

The details and operation of a specific device according to the present application will be described in detail below with reference to the accompanying drawings.

A material transferring and positioning device for a wheel machining center includes a base plate 1, a base 2, a first bearing 3, a first shaft sleeve 4, a hydraulic cylinder brake 5, a rotary cylinder 6, a cap 7, a second shaft sleeve 8, a second bearing 9, a sleeve 10, contacts 11, first linear bearings 12, springs 13, a synchronous cam 14, an end cap 15, a rotating shaft 16, a conical support 17, guide shafts 18, a bearing seat 19, second linear bearings 20, a mount 21, a connecting plate 22, a mounting plate 23 and a cylinder 24.

The material transferring and positioning device for a wheel machining center is provided with a high-precision centering mechanism and a circumferentially automatic adjusting mechanism.

In the high-precision centering mechanism, the hydraulic cylinder brake 5, the rotary cylinder 6, the sleeve 10 and the second shaft sleeve 8 are installed on the first shaft sleeve 4; the second bearing 9 and the rotating shaft 16 are enclosed in the second shaft sleeve 8 by the end cap 15, and the two ends of the rotating shaft 16 are respectively connected to the output shaft of the rotary cylinder 6 and the synchronous cam 14; the three or more first linear bearings 12 are uniformly installed in the side wall of the sleeve 10; three or more uniform curved surfaces are provided in the side wall of the synchronous cam 14; the outer ends of each of the three or more contacts 11 is provided with one of the springs 13 and the first linear bearings 12, and the inner ends of the three or more contacts are respectively connected to the same number of arcs of the high-precision synchronous cam 14; the two ends of each of the springs 13 are respectively in contact with one of the first linear bearings 12 and the axial end surface of one of the contacts 11, and the springs 13 always have elastic force, so that the inner ends of the contacts 11 are always pressed against the synchronous cam 14;

In the circumferentially automatic adjusting mechanism, the base 2 and the mount 21 are fixed on the base plate 1; the first shaft sleeve 4 is installed in the base 2 by the first bearing 3 and the cap 7; the cylinder 24 is installed in the mount 21 by the mounting plate 23; the output shaft of the cylinder 24 is connected to the connecting plate 22; the two symmetrical second linear bearings 20 are installed in the mount 21 by the bearing seat 19; each of the two guide shafts 18 is provided with one of the second linear bearings 20; the upper ends of the two guide shafts 18 are connected to the conical support 17, and the lower ends thereof are connected to the connecting plate 22.

The rotating cylinder 6 drives the synchronous cam 14 to rotate through the second bearing 9 and the rotating shaft 16; and the arcs uniformly distributed in the side wall of the synchronous cam 14 drive the series of contacts 11 to move radially outward synchronously; and the hydraulic cylinder brake 5 fixes the rotary cylinder 6 at a certain position.

During the resetting of the rotary cylinder 6, the spring 13 presses the axial end surface of the contact 11 to make the inner end of the contact 11 being always in contact with the synchronous cam 14, and the series of contacts 11 are synchronously moved radially inward.

The high-precision centering mechanism rotates around the center of the first bearing 3 by the first bearing 3.

The cylinder 24 drives the conical support 17 to vertically move with high precision by the second linear bearings 20.

Before actual use, the rotary cylinder 6 does not work, the spring 13 is in the maximum length, the outer diameter of a series of contacts 11 is the smallest diameter, and the cylinder 24 is in the contracted state. In actual use, the wheel 25 is placed in the device, the flange surface of the wheel 25 is placed on the upper end of the first shaft sleeve 4, the series of contacts 11 are inserted into the center hole of the wheel 25, and a window of the wheel 25 is above the conical support 17. The rotating cylinder 6 may drive the synchronous cam 14 to rotate through the second bearing 9 and the rotating shaft 16, the arcs uniformly distributed in the side wall of the synchronous cam 14 drive the series of contacts 11 to move radially outward synchronously, the series of contacts 11 finally tighten the center hole of the wheel 25, the hydraulic cylinder brake 5 works, the cylinder 6 is maintained in this state, and the radially positioning of the wheel 25 is completed. The cylinder 24 is fed with high-pressure air; one side of the conical surface of the conical support 17 gradually is in contact with the side corresponding to the specific window of the wheel 25. Under the combined action of the thrust of the cylinder 24 and the gravity of the wheel 25, the conical inclined surface of the conical support 17 applies circumferential thrust to the contact side facing to the window of the wheel 25. At the same time, under the combined action of friction force generated by the high precision first bearing 3 and the flange surface of the wheel 25 with the upper end of the first shaft sleeve 4, the high-precision centering mechanism and the wheel 25 rotate around the center of the first bearing 3, the other side of the conical support 17 is gradually in contact with the side corresponding to the window of the wheel 25, and then the circumferential positioning of the wheel 25 is completed. At this point, the placement and the positioning of the wheel 25 are completed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A material transferring and positioning device for a wheel machining center comprising a base plate, a base, a first bearing, a first shaft sleeve, a hydraulic cylinder brake, a rotary cylinder, a cap, a second shaft sleeve, a second bearing, a sleeve, contacts, first linear bearings, springs, a synchronous cam, an end cap, a rotating shaft, a conical support, two guide shafts, a bearing seat, second linear bearings, a mount, a connecting plate, a mounting plate and a cylinder, the material transferring and positioning device for a wheel machining center is provided with a high-precision centering mechanism and a circumferentially automatic adjusting mechanism;

in the centering mechanism is as follows: the hydraulic cylinder brake, the rotary cylinder, the sleeve and the second shaft sleeve are installed on the first shaft sleeve; the second bearing and the rotating shaft are enclosed in the second shaft sleeve by the end cap, and two ends of the rotating shaft are respectively connected to an output shaft of the rotary cylinder and the synchronous cam; the three or more first linear bearings are uniformly installed in a side wall of the sleeve; three or more uniform curved surfaces are provided in a side wall of the synchronous cam; an outer end of each of three or more contacts is provided with one of the springs and the first linear bearings, and inner ends of the three or more contacts are respectively connected to the same number of arcs of synchronous cams; two ends of each of the springs are respectively in contact with one of the first linear bearings and an axial end surface of one of the contacts, and the springs always have elastic force, so that inner ends of the contacts are always pressed against the synchronous cam;

the circumferentially automatic adjusting mechanism is as follows: the base and the mount are fixed on the base plate; the first shaft sleeve is installed in the base by the first bearing and the cap; the cylinder is installed in the mount by the mounting plate; an output shaft of the cylinder is connected to the connecting plate; two symmetrical second linear bearings are installed in the mount by the bearing seat; each of the two guide shafts is provided with one of the second linear bearings; upper ends of the two guide shafts are connected to the conical support, and lower ends of the two guide shafts thereof are connected to the connecting plate.

2. The material transferring and positioning device for a wheel machining center according to claim 1, wherein, the rotary cylinder drives the synchronous cam to rotate through the second bearing and the rotating shaft; and arcs uniformly distributed in the side wall of the synchronous cam drive a series of contacts to move radially outward synchronously; and the hydraulic cylinder brake fixes the rotary cylinder at a certain position.

3. The material transferring and positioning device for a wheel machining center according to claim 1, wherein, during resetting of the rotary cylinder, one of the springs presses the axial end surface one of the contacts to make the inner end of the contact being always in contact with the synchronous cam, and the series of contacts are synchronously moved radially inward.

4. The material transferring and positioning device for a wheel machining center according to claim 1, wherein, the centering mechanism rotates around a center of the first bearing by the first bearing.

5. The material transferring and positioning device for a wheel machining center according to claim 1, wherein, the cylinder drives the conical support to vertically move with by the second linear bearings.

* * * * *